UNITED STATES PATENT OFFICE 2,623,273

SOLDERED JOINT AND METHOD OF MAKING SAME

William S. Murray, Utica, and Maria T. Ludwick, New York, N. Y., assignors to The Indium Corporation of America, New York, N. Y., a corporation of New York No Drawing. Application May 5, 1945, Serial No. 592,278

3 Claims. (Cl. 29—180)

This invention relates to soldering alloys (including brazing and use of so-called "hard solders" as well as "soft solders") and is a continuation in part of our copending application filed August 3, 1942, Serial No. 453,466, now patent No. 2,464,821, dated March 22, 1949.

Soldered joints are made by placing the surfaces to be joined in proper relation to each other, and applying to such surfaces a molten solder. The solder adheres to the metal surfaces to be joined, and upon solidifying firmly bonds these surfaces together.

The term "soldering" in its generic sense refers to the making of all types of joints with special alloys designed for use in the foregoing manner. In a more restricted sense, the term "soldering" has come to refer to the making of joints as above-described with a joining alloy of low melting point, as, for example, an alloy of lead; and the term "brazing" is commonly applied to the making of such joints with a joining alloy of relatively high melting point, such, for example, as a copper-base alloy. In some instances the terms "brazing" and "soldering" are used interchangeably, especially when using silver-base joining alloys. Such joining alloys are referred to, for example, either as brazing alloys or as hard solders. In this specification the terms "solder" and "soldering" are used herein in the generic sense to include operations customarily referred to in the art as "brazing."

It is essential, in order to produce a good soldered joint, that the soldering alloy adhere well and uniformly to the metal surfaces to be joined. This is accomplished only if the molten soldering alloy thoroughly wets the surfaces to which it is applied for the purpose of joining them. In fact, the thoroughness with which the soldering alloy wets the metal surfaces to which it is applied is a more or less direct measure of the firmness with which the alloy adheres to such surfaces, and hence of the soundness of the joint. If the metal surfaces to be joined are contaminated with oxides, etc., the solder may not effectively wet the metal, and the joint in consequence will be weak. For this reason it is customary in making soldered joints to employ a flux, such as rosin borax, acidified zinc chloride solution, or other agent capable of cleaning the surfaces and so better preparing them to receive the molten solder. In some cases, however, residual flux presents a serious disadvantage so that there has been an urgent need for solders themselves capable of easily wetting the metal surfaces to which they are applied in the molten state. The more readily a solder wets the surfaces to be joined therefore, the more perfect the joint and the less the time and skill required for making it.

It is also desirable and frequently necessary, not only to secure wettability and flowability but to accomplish this without substantial vapor pressure at the soldering temperatures.

It is one object of this invention to create brazing and soldering alloys having improved wetting and flowing characteristics. Another object of the invention is to provide satisfactory solders of melting points different from those now available, whereby to facilitate soldering where special conditions impose temperature limitations. Another object of the invention is to provide solders which possess not only satisfactory wetting properties and flowing properties but also alloys possessing these properties in combination with satisfactorily low vapor pressures at soldering temperatures.

It is also desirable to lower or adjust the melting range of solders, i. e., obtain a desired range of liquidus temperatures without substantially increasing the volatility of such alloys or components thereof at soldering temperatures and it is a further object of this invention to provide method and means of accomplishing this result and to provide the art with solders having a predetermined liquidus and predetermined low volatility at operating temperatures, all in combination with the advantage of satisfactory wettability.

We have discovered that the ability of molten solders to flow and to wet metal surfaces to be joined may be substantially increased by incorporating metallic indium in the solder while maintaining the vapor pressure of the resulting alloy, at soldering temperatures, within desired or predetermined limits. Based on this discovery, the present invention provides an improved method for increasing the ability of a solder to flow and to wet the surface of a metal having a higher melting point than the solder, which comprises incorporating metallic indium in the solder. Generally speaking, from 0.5% to 25% of metallic indium may be used in the solder effectively for this purpose. In many cases, an indium content of 1% to 5% in the solder is most satisfactory. These percentages and others given throughout this specification are by weight of the alloy.

The invention contemplates the inclusion of indium in solders comprising largely one or more metals of the group consisting of lead, copper, silver or tin with or without small amounts of nickel, as such alloys are most commonly used for soldering purposes. The indium may, however, be incorporated in any solder to increase its ability to wet metal surfaces.

The invention further contemplates the method of joining two or more metal surfaces by soldering which comprises applying to said surfaces when in proper position relative to each other a molten indium-containing alloy made as described above. In addition, the invention contemplates the provision of an article having an improved soldered joint, in which the solder at the joint contains indium. The scope of the invention of course includes, in the art of soldering, a solder as such made as described above and containing indium in an amount effective for increasing the ability of the solder to wet surfaces to be joined.

Although the invention is applicable generally to solders, and to the use of such solders generally in the making of soldered joints, it is described below by way of example with particular reference to several exemplary soldering alloys.

A common alloy used for low-temperature soldering is composed of lead together with a substantial percentage of tin. The inclusion of tin in the alloy lowers its melting point and also increases its ability to wet and so adhere to surfaces to be soldered together. Various attempts have been made to substitute other metals for the tin, but without notable success, because other lead-base alloys do not effectively wet and adhere to many industrially used metals.

The most promising of the tin-free solders have been composed of lead and silver, with or without small additions of other metals. The chief drawback to lead-silver alloys for soldering purposes is their inability, in the molten state, to wet other metal surfaces effectively. For example, an alloy containing 3% silver and the balance essentially lead, when in the molten condition, spreads with difficulty on other non-ferrous surfaces and with even greater difficulty on ferrous surfaces, and often accumulates on such surfaces in the form of weakly-adhering lumps even when a good soldering flux is carefully employed. A joint between two flat metal surfaces formed by soldering with this alloy is relatively weak, having a tensile strength of the order of 2400 pounds per square inch.

In contrast, an alloy composed of 3% silver, 1% indium, and the balance essentially lead has been found to spread easily and smoothly on both ferrous and non-ferrous metal surfaces, indicating that the alloy thoroughly wets such surfaces. A joint between two flat surfaces made with this indium-containing alloy in the same manner as the aforementioned joint made with the lead-silver alloy was found to have a tensile strength substantially in excess of 3000 pounds per square inch, an increase upwards of 25%. An alloy containing 3% silver, 2% indium, and the balance essentially lead spreads, when in the molten condition, even more easily than the alloy containing 1% of indium, on both ferrous and non-ferrous metal surfaces, indicating that it wets such surfaces even more readily. A joint made between two flat surfaces with this latter indium-containing alloy was found to have a tensile strength upwards of 4000 pounds per square inch. The melting point of the above-described indium-containing alloys is about 590° F. This melting point is of the same order as the melting point of the common lead-tin and lead-silver solders, so that the improved alloys may be used effectively in the same manner and with the same soldering apparatus commonly used for soldering with lead-tin alloys. The indium contributes the stated functions without undesirably increasing the vapor pressure at brazing temperatures.

An alloy quite commonly used for relatively high temperature brazing is composed of about 72% silver and about 28% copper. This alloy (known also as a hard silver solder) may be used fairly effectively for joining non-ferrous metal surfaces, but it does not effectively wet ferrous metal surfaces and may not be used to produce strong joints between ferrous metal surfaces, or between a ferrous surface and a non-ferrous surface. Examination of a brazed joint made between steel surfaces with this copper-silver brazing alloy revealed that 50% of the surface of the steel covered by the brazing alloy at the joint was unwetted by the brazing alloy and therefore non-adherent thereto. In contrast, an alloy containing 28% copper, 2% indium, and 70% silver was found to have the property, in the molten condition, of thoroughly and easily wetting not only non-ferrous but also ferrous metal surfaces. A brazed joint between steel surfaces made with this alloy reveals, upon examination, that the steel is virtually completely wetted by and adherent to the brazing alloy, and this result is accomplished without any substantial volatilization or other loss of components of the brazing alloy as a result of the elevated temperatures employed in the brazing operation.

An alloy composed of 95% copper and 5% silver may be used fairly effectively for joining ferrous metal surfaces by soldering, if employed in conjunction with a good flux. However, by incorporating indium in the composition to produce an alloy containing 5% indium, 5% silver, and the balance copper, the alloy in the molten state is made to wet both ferrous and non-ferrous metal surfaces even more easily than the indium-free alloy. The addition of this amount of indium to the alloy also materially increases its hardness, which for some purposes is highly desirable.

Commercially pure silver is unsatisfactory for soldering purposes, because of the reluctance with which silver wets any of the common base metals, and particularly ferrous metals. It has been found that an alloy composed approximately of 92% silver and 8% indium wets not only non-ferrous but also ferrous metal surfaces easily and thoroughly, and the alloy may therefore be used with common soldering fluxes for making sound soldered joints in either ferrous or non-ferrous metal articles.

The difficulty of soldering with an aluminum-base alloy is well known. Heretofore no effective method for soldering other metal surfaces with aluminum alloys has been known. We have discovered, however, that good soldered joints may be produced using an alloy composed of about 75% aluminum and about 25% indium. This alloy is very soft, but may be used to produce fairly good soldered joints whenever its softness and other properties are desired.

Gold has been used for special soldering operations when its physical and chemical properties are desired, but it possesses a rather high melting point and does not always easily wet the surface to be soldered. On the other hand, an alloy of 85% gold and 15% indium has been found to be excellent solder. Its melting point is substantially lower than that of gold (being about 850 °F.), but it possesses the properties of gold so far as resistance to chemical attack, nonvolatility, and the like are concerned. It easily wets metal surfaces to which it is applied, and so is effective for soldering purposes.

The foregoing examples of solders produced in accordance with the invention are by way of example only, and it is understood that other solders may be produced in accordance with the invention by the addition of indium to a solder composition, and in general it has been found that the liquidus temperature or range of temperatures of solders may be lowered and the wettability and flowability thereof improved by incorporating indium without the disadvantage of any undesirable increase in vapor pressure and therefore without suffering a volatilization loss during the soldering operations.

By way of further illustration it may be pointed out that the properties of the tin-silver solders may be improved by the addition of indium, i. e., the ability of the tin-silver solders in general to wet surfaces and to flow may be greatly improved by adding varying proportions of indium say from about 2 to about 15 per cent by weight of indium, while at the same time maintaining the vapor pressure within limits such that no undesirable volatilizing disadvantages are encountered. The proportions of tin, silver and indium may vary over considerable ranges, e. g., about 35 to 85 per cent tin, about 65 to about 15 per cent silver and about 1 to 15 per cent indium. A specific example is an alloy containing about 10 per cent indium and about equal parts by weight of tin and silver. The shear strength of such alloys may be improved by incorporating small proportions of elements such as nickel and copper, e. g., 0.5 to 5% copper and for 0.3 to 3.0 per cent nickel, i. e., the nickel and copper may be used separately or together. Such alloys specifically are claimed in our copending application, Serial No. 536,611, filed May 20, 1944, of which this is a continuation in part.

In making soldered joints in accordance with the invention, the parts to be joined are arranged in proper position relative to each other, and the molten solder is applied by any convenient means. Perhaps the most common method is to heat the parts to be joined with a torch or with a soldering iron, and to melt the solder in close proximity to the joint by means of the torch or the iron. The molten solder thus is caused to flow into the joint and to unite the parts to be joined.

Other methods of applying the solder also may be employed. For example, one or both of the surfaces to be joined may be coated with a thin film of the solder, and the surfaces may then be heated to above the melting temperature of the solder, and at the same time, may be pressed together. When the parts have cooled sufficiently for the solder to have solidified, the joint is completed.

Any of the common soldering fluxes may be used to facilitate the making of joints in the manner described.

Still another method of soldering in accordance with the invention involves applying to the metal surface a film of metallic indium, and then causing an indium-free solder to flow in the molten condition over the indium-coated surface. The indium film promptly alloys with the molten solder, forming an indium-containing alloy therewith, and the resulting alloy easily wets and adheres to the surface of the metal with which it is in contact. Often no flux is necessary if this soldering procedure is employed.

The making of electrotype affords an example of soldering by this method. The usual procedure in the manufacture of electrotype involves electrodepositing copper on the conducting surface of a type impression, and thereafter pouring a molten lead-base alloy into the back of the electrodeposited copper film to produce a mechanically strong block of electrotype. It is important that the lead alloy adhere well to the back of the electrodeposited copper film, and for this purpose it has been customary in the past to apply a soldering flux to the back of the copper and to lay over it a sheet of tin. The present invention contemplates the improvement which comprises electrodepositing a thin film of metallic indium on the back of the electrodeposited copper, and then pouring the lead-base backing alloy thereon. The indium film promptly alloys with the lead backing, forming at least at the interface between the backing and the copper an indium-containing lead alloy which easily wets and strongly adheres to the copper. In general, no soldering flux is necessary to secure a strong soldered bond by this improved method between the backing metal and the copper type face, although a flux may be employed if desired. Such electrotypes are claimed in a copending application, Serial No. 536,612, filed May 20, 1944.

Articles having soldered joints properly made in accordance with the invention are characterized by the uniformity and completeness with which the soldering alloy has wetted and adhered to the joined surfaces, and in consequence by the soundness of the solder joint.

We claim:

1. An article having a soldered joint in which adjoining surfaces of base metal are bonded together solely by a single solder alloy consisting of 3% silver, 1 to 5% indium and the balance lead.

2. A method of joining two or more base metal surfaces in a predetermined position relative to each other which consists essentially in heating said surfaces, applying to at least one of said surfaces a single solder alloy consisting of 3% silver, 1 to 5% indium and the balance lead, wetting both of said surfaces with the said solder in molten form, and cooling said surfaces and solder to a temperature below the melting point of said solder thereby creating a firm bond between said metal surfaces.

3. A method of improving the wetting action of a lead-base solder, consisting of 3% silver and the balance lead, with respect to a metal having a higher melting point than said solder, which consists in incorporating 1 to 5% metallic indium in said lead-base solder.

WILLIAM S. MURRAY.
MARIA T. LUDWICK.

REFERENCES CITED

The following references are of record in the file of this patent:

UNITED STATES PATENTS

| Number | Name | Date |
|---|---|---|
| 1,934,730 | Murray | Nov. 14, 1933 |
| 1,960,740 | Gray | May 29, 1934 |
| 2,157,933 | Hensel | May 9, 1939 |
| 2,220,901 | Kern | Nov. 12, 1940 |

(Other references on following page)

UNITED STATES PATENTS

| Number | Name | Date |
|---|---|---|
| 2,306,667 | Smith, Jr. | Dec. 29, 1942 |
| 2,464,821 | Ludwick et al. | Mar. 22, 1949 |

OTHER REFERENCES

L. Sterner, Rainer, Indium Alloys—Deut-Goldschmiedeztg 41, 3 (1938) as briefed in Chem. Abstracts, vol. 34, col. 5400. (Copy in Div. 6.)

Monthly Review, Amer. Electro. Society, vol. 28, 1941, p. 191. (Copy in 75/In.)

Proceedings, Amer. Electro. Society, June 1942, pp. 100, 101, 195 relied upon (complete article pp. 99–105 incl.). (Copy in 75/In.)

Indium and Indium Plating, by M. T. Ludwick; cited of record; pp. 14, 15, 16, relied upon (complete article pp. 13–17 incl.). (Copy in 75/In.)

Indium and Indium Plating by M. T. Ludwick, Metal Finish, January 1942, p. 16. (Photostat copy in Div. 14.)

French: A New Low-Melt. Alloy—Industrial and Engineering Chem., vol. 27. December 1935, pp. 1464, 1465. (Briefed in Metals and Alloys, vol. 7, 1936, pp. MA258.)

Vickers: Metals and Their Alloys, 1923, Henry Carey Baird & Co., pub. New York, pp. 578, 579. (Copy in Div. 3.)

French: Use of Indium in Fusible Alloys, Metal Ind. (N. Y.) 35, 106–7 (1937): briefed in Chem. Abstracts, vol. 32, 1938, col. 468. (Copy in Div. 6.)